United States Patent [19]

Kikinis

[11] Patent Number: 6,049,291

[45] Date of Patent: Apr. 11, 2000

[54] INTERACTIVE TWO-WAY PAGER SYSTEMS

[75] Inventor: Dan Kikinis, Saratoga, Calif.

[73] Assignee: DataLink Net, Inc., San Jose, Calif.

[21] Appl. No.: 09/156,569

[22] Filed: Sep. 17, 1998

Related U.S. Application Data

[62] Division of application No. 08/708,817, Sep. 9, 1996, Pat. No. 5,838,252.

[51] Int. Cl.[7] ........................................ G08B 5/22
[52] U.S. Cl. .................. 340/825.44; 455/458; 370/310
[58] Field of Search ................. 340/825.44, 825.69, 340/825.54; 455/458, 526, 517, 575, 38.1; 370/310, 313

[56] References Cited

U.S. PATENT DOCUMENTS

| | | | |
|---|---|---|---|
| 5,479,408 | 12/1995 | Will | 340/825.44 X |
| 5,487,100 | 1/1996 | Kane | 340/825.44 X |
| 5,630,207 | 5/1997 | Gitlin et al. | 340/825.44 X |

*Primary Examiner*—Michael Horabik
*Assistant Examiner*—Anthony A. Asongwed
*Attorney, Agent, or Firm*—Donald R. Boys

[57] ABSTRACT

A two-way pager system is adapted for interactive process between a pager server and a subscriber carrying the pager. A first message sent by the pager server has labels for return buttons on the pager, and in response to the subscriber selecting a return button the pager server sends a new pager message with new labels for the return buttons whereby the subscriber may further instruct the pager server. Systems are disclosed for stock transaction alerts wherein a subscriber can reprogram variables at the server, and for e-mail alerts and forwarding, wherein the subscriber can select and alter delivery types, such as voice, fax and so forth, and may also select multiple and alternative destinations for copies of the original message to be forwarded. In some embodiments a subscriber can select and return canned responses to the originator of an e-mail, by pressing appropriate return buttons which the server matches with the canned responses.

5 Claims, 6 Drawing Sheets

| Line Number | Server | User |
|---|---|---|
| 200 | Page e-mail alert 1 | |
| 201 | | Read page |
| 202 | | Select response 3 |
| 203 | Send e-mail to sender of alert1 | |
| 204 | Page stock alert xyzx +2 | |
| 205 | | Read alert |
| 206 | Page stock alert ZZxx -1 | |
| 207 | | Read alert |
| 208 | | go back to page xyzx |
| 209 | | increase limit to 3 |
| 210 | Note changed limit on xyzx | |
| 211 | Page news item on ZZxx | |
| 212 | | Read news item |
| 213 | | go back to page ZZxx |
| 214 | | initiate buy @ market of c'00s |
| 215 | Forward buy request to dealer | |
| 216 | Page acknowledgment | |
| 217 | | Read acknowledgment |
| 218 | | go back to page xyzx |
| 219 | | reduce limit to 2 11/16 |
| 220 | Note changed limit on xyzx | |
| 221 | | |

*Fig. 2*

INTERACTIVE TWO-WAY PAGER SYSTEMS

CROSS REFERENCE TO RELATED DOCUMENTS

This patent application is a divisional of U.S. application Ser. No. 08/708,817, filed Sep. 9, 1996, now U.S. Pat. No. 5,838,252, and is related to U.S. application Ser. No. 08/673,350 entitled "Mail Alert System" and to U.S. patent application Ser. No. 08/687,161 entitled "Real-Time Transaction Alert System".

FIELD OF THE INVENTION

The present invention is in the field of pager alert systems, and pertains more particularly to those services that provide for interactive response to pages. The invention relates as well to cellular telephones that are adapted for receiving and responding to pager signals.

BACKGROUND OF THE INVENTION

One of the fastest growing areas of technology at the time of filing the present application is the area of message communication. In the information world, rapid access to information and rapid response to messages is often critical to maintain a competitive edge or to be able to take advantage of rapidly changing opportunities. Many message services have been developed and are made available in various ways by service providers, and new such services include are regularly under development. Such services e-mail, facsimile, voice or pager, and combinations of these and other modes.

Among the many message services provided, some are essentially one-way in nature. That is, a service can notify you of an event or a trend, but you may not be able to make an immediate response, and any response may require access to a different apparatus than that upon which or by which the message was delivered.

Paging services have historically fit into the above-described category of no-response systems. Pagers have recently been developed, however, that allow limited response. These pager devices have buttons, usually two to four, that provided for an incremental signal return. Such pagers also typically have a memory system allowing a limited number if pager messages to be stored and recalled, from as few as perhaps ten in some less-expensive pagers, to as many as a hundred or more in more expensive models. The activation of the different buttons and combinations of buttons may be recognized at the sender's facility. Pre-programmed code associated with the button signals may be executed, initiated by the receipt of the button signals. It is with these sorts of pager systems that the present invention is concerned.

With available responsive pager systems typically a single response is solicited and acted upon. What is needed is an interactive system making use of two-way pager abilities wherein ongoing rounds of interactive selections may be made allowing a user to make specific selections out of a variety of options and/or to initiate execution of specific actions based on certain types of information received, independent of whether or not the action is directly related to the received information.

SUMMARY OF THE INVENTION

In a preferred embodiment of the present invention an interactive two-way pager system is provided comprising a pager server adapted to send pager messages and a two-way pager having a display for displaying messages sent by the server and having also two or more return buttons adapted for sending specific incremental signals to the pager server. In the system the pager server labels the buttons for response in a first message, recognizes the response from a selected return button, and, initiated by the response, sends a second message with new selections for response.

The system in this embodiment may send stock alerts based on pre-programmed price changes, and the responses are recognized as buy and sell signals. In some embodiments of such a stock alert system a user can amend pre-programmed price changes through selection of responses via the return buttons. The back-and-forth communication afforded allows much more complicated and useful interactivity than has heretofore been present in the art of pager systems.

In one embodiment of a stock alert system according to the invention the server, by preprogrammed information, sends a menu bar listing tracked stocks to a subscriber at pre-programmed time intervals, and the server is adapted to respond to a stock selected by the subscriber's selection of a labeled return button by sending a pager message to the subscriber allowing the subscriber to alter up and down price limits in the server's program by which the server triggers stock alerts. In some embodiments of this remote preprogramming repeated selection of a return button sends incremental repeated change signals for the server to amend up and down trade limits.

In an alternative embodiment the server is adapted to provide e-mail alerts, and the return buttons are programmed to select pre-programmed responses to be sent by the server to the sender of the e-mail. In some such embodiments the system sends e-mail messages portion by portion to a subscriber as the subscriber triggers more information through the return buttons. In others the server downloads an e-mail message to the subscriber's pager, which stores it, allowing the subscriber to read the message portion-by-portion on the pager's display. In some embodiments the server is adapted to route copies of the e-mail message for which the subscriber was alerted to destinations preprogrammed and selected by the subscriber via selection of return buttons.

In an alternative embodiment a two-way pager system adapted for e-mail alerts is provided comprising a pager server adapted to send alerts to a subscriber that one or more e-mail messages are available to be delivered and a two-way pager having a display for displaying messages sent by the server and having also two or more return buttons adapted for sending specific incremental signals to the pager server. In this system the pager server labels the buttons for response in a first message, recognizes the response from a selected return button, and, initiated by the response, sends an associated, pre-programmed message to the sender of the e-mail.

In another embodiment of the invention a method for two-way interaction between a subscriber using a two-way pager having a display and return buttons and a pager server, comprising steps of (a) sending a first message to be displayed by the pager server, including labels for return buttons; (b) receiving and displaying the message at the two-way pager; (c) selecting a response by pressing one of the labeled return buttons; (d) receiving the response at the pager server; (e) matching the response with a new message and new labels to be sent; and (d) sending the new message and the new labels to the two-way pager.

In yet another embodiment a method is provided for routing an e-mail message for a subscriber, comprising steps of (a) storing the e-mail message sent to the subscriber on a pager server; (b) sending a pager message including labels for return buttons to a two-way pager carried by the subscriber, alerting the subscriber of the presence of the e-mail message; (c) monitoring responses from the subscriber selecting the labeled return buttons; (d) matching return button responses with preprogrammed destinations and message types; and (e) forwarding the e-mail messages by the appropriate matched type to the appropriate matched destination.

In still another embodiment a method is provided for providing a response to a sender of an e-mail message, comprising steps of (a) storing the e-mail message at a pager server; (b) alerting a subscriber of the presence of the e-mail message by sending a pager message to a two-way pager carried by the subscriber the pager message including labels for return buttons; (c) monitoring responses by the subscriber selecting return buttons; (d) matching a return button response with prestored return message for a sender; and (e) sending the prestored return message to the sender of the e-mail message.

Until the advent of the present invention response by a two-way pager and the range of communication and instruction that could be accomplished was extremely limited. With the present invention the range of communication and instruction is vastly enlarged.

BRIEF DESCRIPTION OF THE DRAWINGS

FIG. 2 is a pseudo-script listing of control code for an embodiment of the present invention.

DETAILED DESCRIPTION OF THE PREFERRED EMBODIMENT

Figure 1:
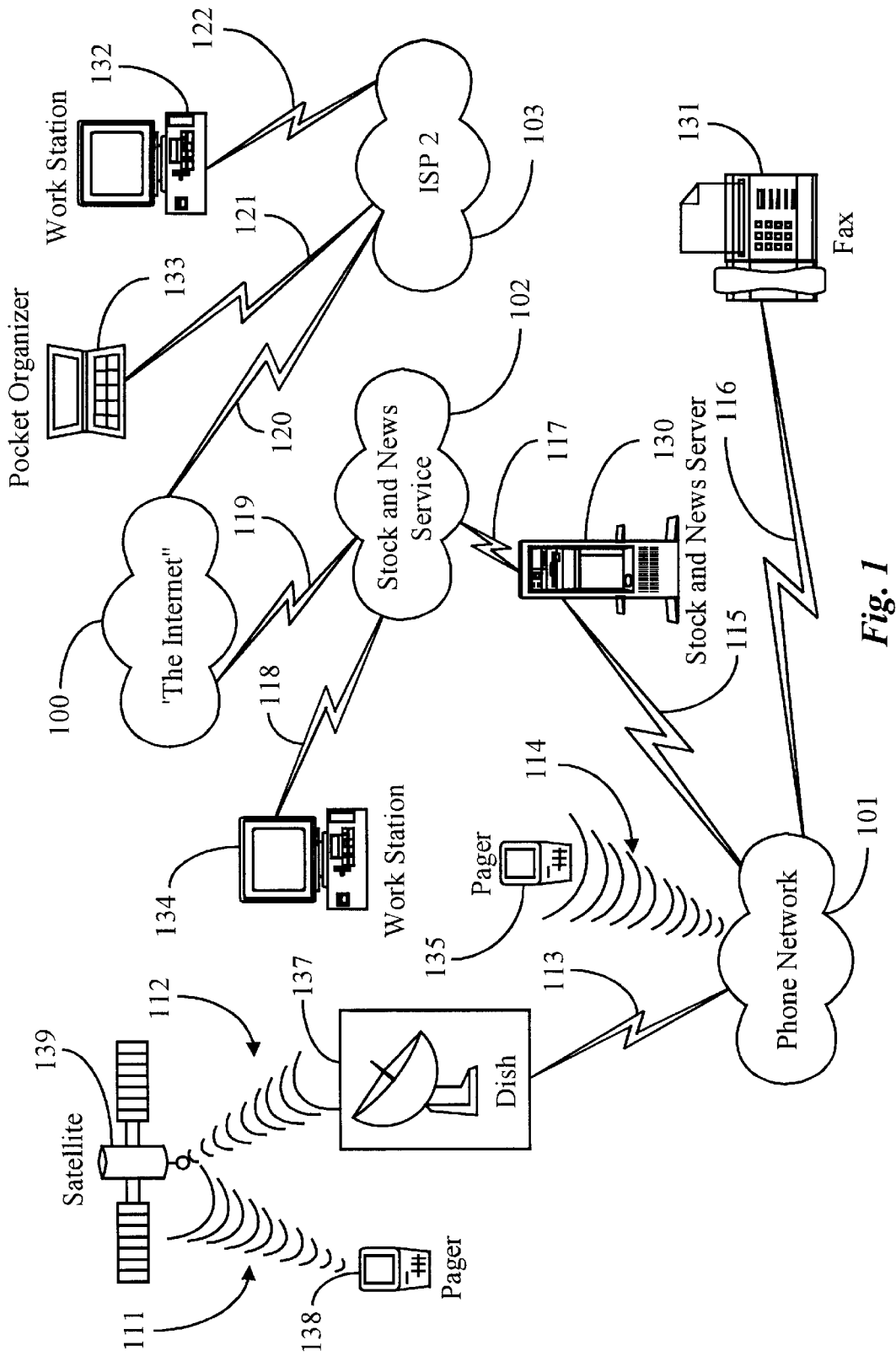
FIG. 1 is a topology diagram illustrating interconnection of equipment in an embodiment of the present invention.

FIG. 1 is a topology diagram of a system embodiment for practicing the present invention. The focus of the system in this example is a Stock and News Service 102 which is a collection of interconnected servers each capable of one or more specific services through paging systems. A representative Server 130 in this embodiment is connected to the public phone network 101 via link 115 which may be any known telephony connection, such as Integrated Services Digital Network (ISDN). Through the phone network server 130 can send faxes via link 116 to fax machines represented by fax 131. Server 130 may also send pages and receive pushbutton responses via link 114 to two-way pagers, and via link 113 to satellite dish 137, thence uplink 112 to satellite 139 and downlink 111 to two-way satellite pagers 138.

Server 130 is also connected via link 117 to other servers in cloud 102 and through the internetwork of cloud 102 to workstations (134 via link 118), the Internet cloud 100 via link 119, and through the Internet to individual service providers 103 (Netcom™, Microsoft Network™ et al.) by link 120, and via the ISPs to pocket organizers (133 via link 121) and other workstations (132 via link 122).

It will be apparent to those with skill in the art that these interconnections may be many and varied, and may be interconnected and integrated in many known ways not shown in FIG. 1.

Figure 3A:
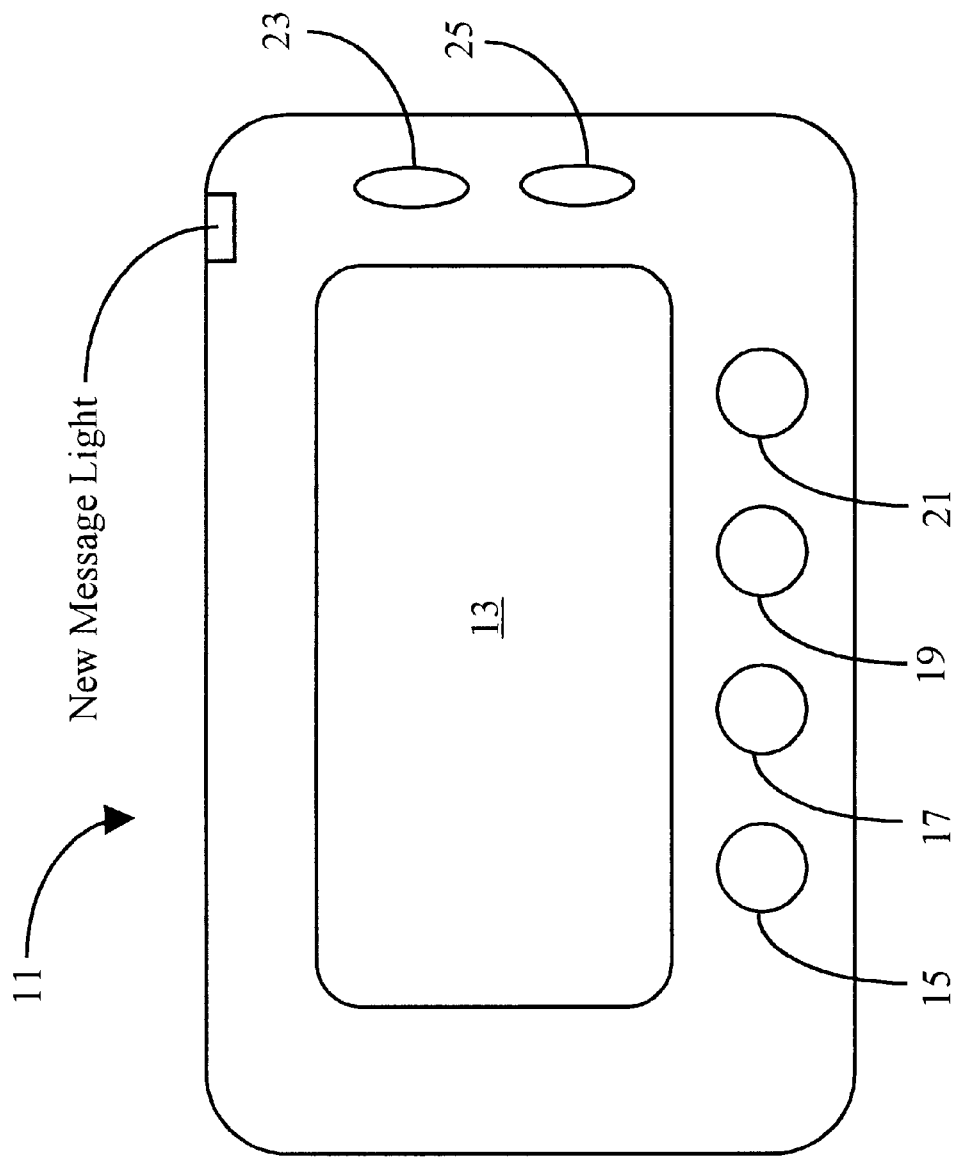
FIG. 3A is a plan view of a two-way pager device as used to practice the present invention.

FIG. 3A is an example of a two-way pager 11 as known in the art and may be either of pagers 135 and 138 in FIG. 1. Pager 11 has a four-line LCD display 13 that is forty characters in width, four selection buttons 15, 17, 19, and 21, and two scroll buttons 23 and 25.

In one embodiment of the invention a stock service is provided by Service 102 implemented in server 130. This example, one of many that may practice the present invention, will serve to illustrate unique aspects of the invention.

The stock service in this example tracks specific stocks for specific subscribers, preprogrammed by the subscribers, and notifies the subscribers of movement of stocks. One subscriber, for example, might track four stocks, called here stock A, stock B stock C, and stock D. For each stock the subscriber has preprogrammed variables and responses. The subscriber may, for example, from a workstation (132), before leaving home, set an up limit and a down limit for each of his stocks of interest, and preprogram response buttons for a two-way pager communication. He then takes his pager (11) and leaves home.

Figure 3B:
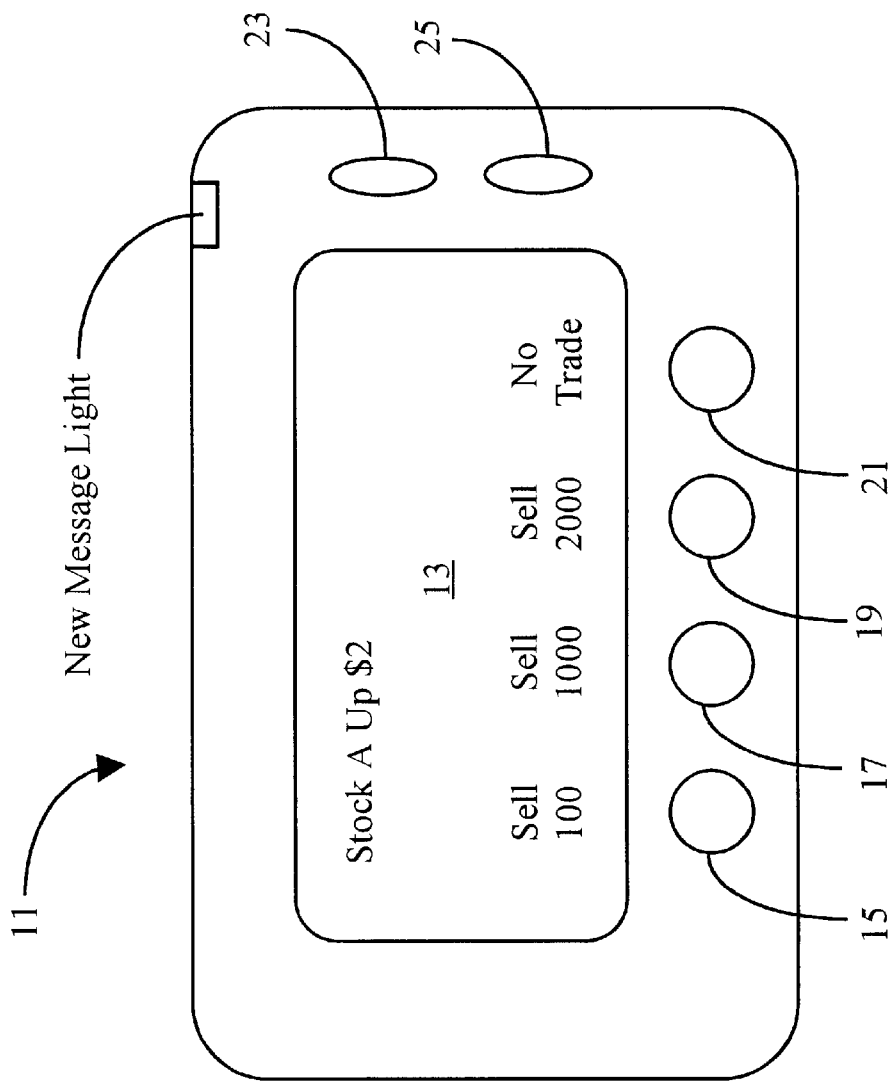
FIG. 3B is the pager device of FIG. 3A with a message and labels displayed.

During the business day the stock service sends pager messages to the subscriber any time one of the preprogrammed limits is met. For example, an up limit for stock A has been set for $2. When (and if) stock A goes up $2 a page goes out to the subscriber's pager and a response is expected. Referring now to FIG. 3B, the page massage may say "Stock A up $2". And the four response buttons are labeled in the message "sell 100", "sell 1000", "sell 2000", and "No Trade" for no transaction. It will be apparent to one with skill in the art that the responses could all be sells, all buys, or appropriate mixes of buys or sells and so forth. In the programming of the server 130 and according to arrangement previously made, the subscriber may respond by pressing one of the four response buttons, signaling a broker to initiate and complete the wanted transaction. Now, if stock A rises another two dollars, the pager will again be exercised, and the subscriber will have an opportunity to transact another buy or sell. Also, the down limits may be triggered in a similar fashion, and for any one of the four stocks.

From this example, with a limited screen and limited response buttons, it is clear that the subscribers options are very limited. Suppose, for example, that the movement of stock B is such over the first hour that the subscriber wants to amend the up limit to have more opportunities for initiating transactions. Suppose in another instance the subscriber wishes to follow twenty stocks instead of four. In the current art there is no provision for such interactivity and selectivity.

Figure 3C:
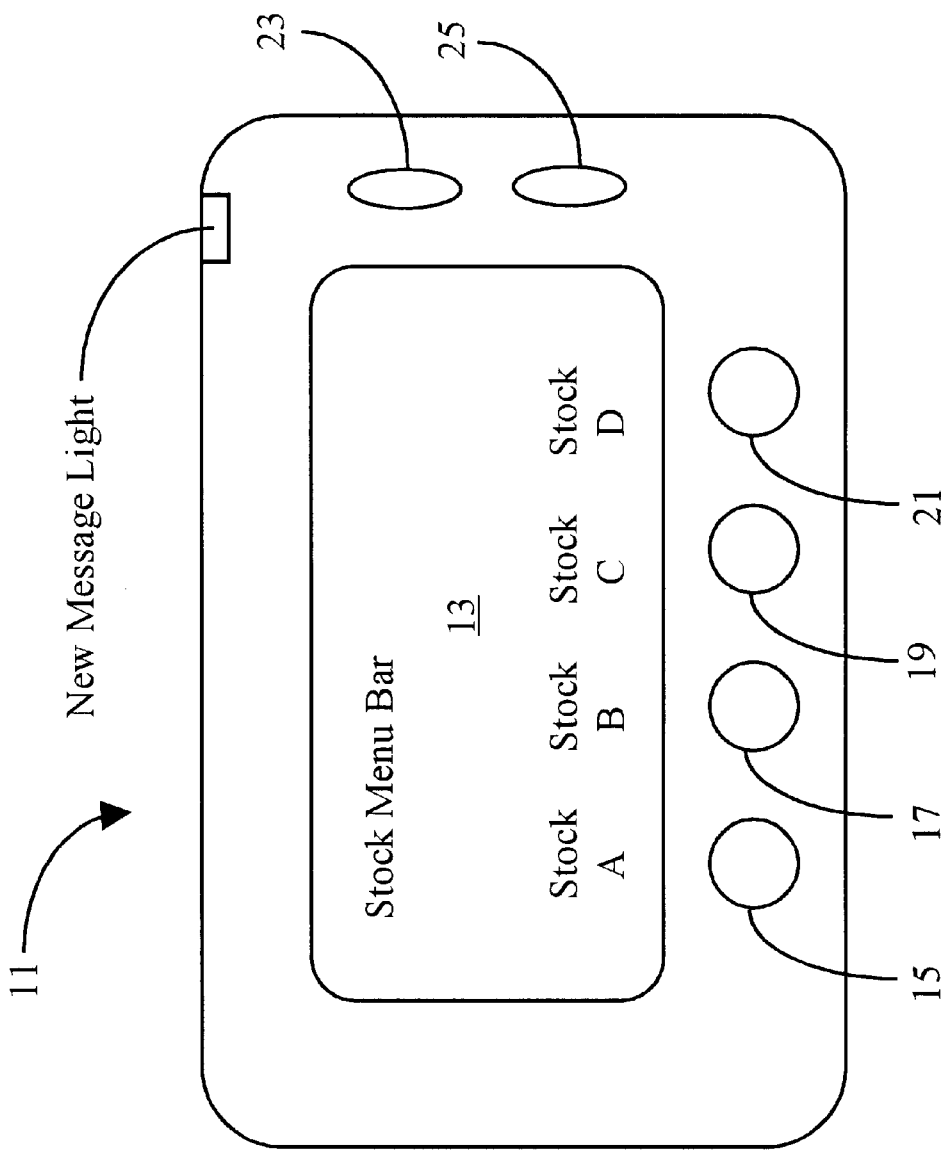
FIG. 3C is the pager device of FIG. 3B with a different message and labels displayed.

Referring now to FIG. 3C, in an embodiment of the present invention, at specified preprogrammed intervals during the day server 130 sends a menu bar to the subscriber, allowing the subscriber to interact with the server to alter preprogrammed variables. FIG. 3C shows an example of such a menu bar, listing stock A, stock B, stock C, and stock D adjacent to the four response buttons. The broadcast interval may be thirty minutes, two hours, or any interval the subscriber wishes to preset.

Figure 3D:
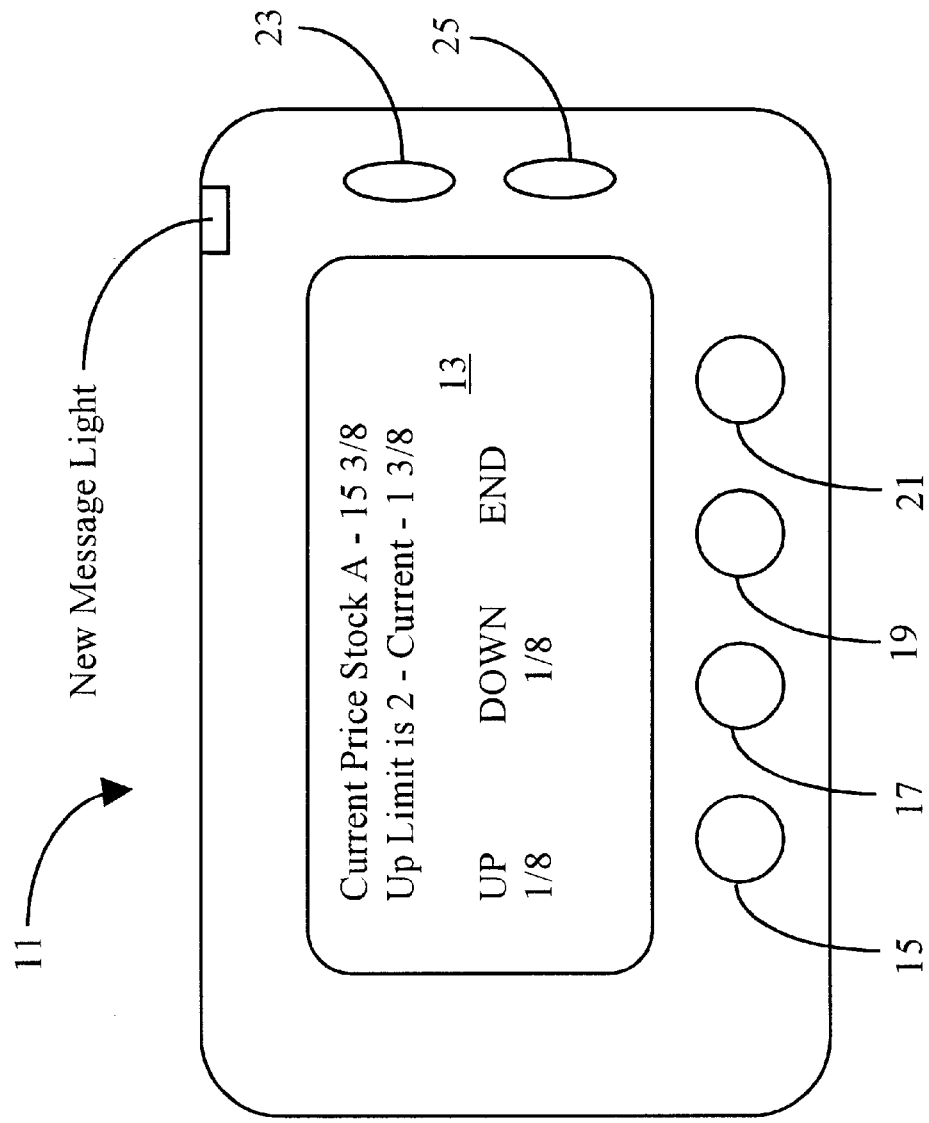
FIG. 3D is the pager device of FIG. 3C with yet another message and other labels displayed.

When the menu bar is sent, the subscriber may immediately respond, or may store the menu bar like any other message to be later retrieved and responded to. When the subscriber in this example presses a button in response to the menu bar, assume button A, the server responds by transmitting a new page with new choices, such as shown in FIG. 3D. This message gives the current price of stock A and the current Up Limit setting. Three of the four response buttons are now labeled "Up ⅛", "Down ⅛", and "End". The subscriber may now alter the up limit either up or down in a ⅛ increment in one further response. If the subscriber also pushed the "End" button the system sets the new up limit and comes back with a new message offering to amend the down limit in the same fashion. If not, the system comes back with a message offering to amend the up limit further. In this interactive fashion the up limits and the down limits may be altered at any time without access to a computer or a telephone, just through the two-way pager.

It will be apparent to those with skill in the art that the arrangement of the messages and the interactive button programming can be done in a wide variety of ways allowing the interactivity described.

Now, in the event that a subscriber wishes to track a relatively large number of stocks, the Menu Bar may be offered at several levels. For example, sixteen stocks may be divided into four groups, with four stocks in each group. The Menu Bar in this embodiment offers by the four buttons any one of four stock groups. When a subscriber selects a group the server responds with a new message offering the four stocks in the group, and the subscriber may then select a specific stock. From that point interactivity is as described above.

In current art pager message an return cycles are on the order of a minute or so. This is not real-time response, but for the advantage of being able to interact in a much more meaningful way should be acceptable. Moreover, message speed is improving with further development in the art, as might be expected.

The stock server system described above is but one example of a type of service that may be provided according to various embodiments of the invention. Other examples of systems in various embodiments are e-mail alert systems, wherein a subscriber is alerted by two-way pager of arrival of an e-mail, and may select by interactivity with the server to view specific portions, to have copies sent to various destinations and in various ways (e-mail, fax, voice, etc.), and to send simple responses to the sender of the e-mail by button selection.

FIG. 2 is a pseudo-code listing of code on a server such as server 130 in an embodiment of the present invention. In Line 200, the server sends a pager message to a subscriber for an e-mail alert. The user reads the message on Line 201 and decides to use preconfigured responses. In Line 202, the server receives the subscriber's response. On Line 203 the server sends the subscriber's selected response to the sender of the Alert 1. At line 204, a pager message is sent for a stock alert; specifically that stock xyzx has moved up the two points that was set as the alert Up limit. On Line 205, the user reads the alert. On Line 206 the next incident is a stock alert on stock ZZxx of minus 1. On Line 207 the user reads the ZZxx alert, and decides now to change the up limit on the first stock xyzx. The subscriber uses the appropriate button or buttons as described above, and the system receives the response(s) to raise the limit to 3. The server then changes the limit accordingly on Line 210.

There is a news item on stock ZZxx that is paged to the subscriber. The user reads the news item. On Line 213, the user retrieves a stored menu bar and interactively signals a buy of a multiple of 100 shares by pushing the correct button multiple times. That request is forwarded on Line 215 to the appropriate broker with which an agreement is in place to cover such electronic transactions. Once the dealer acknowledges the trade, the acknowledgment is paged on Line 216 and the subscriber can see the acknowledgment in Line 217. In Line 218, the subscriber goes back stock xyzx and reduces the limit down to $2^{11}/_{16}$, and on Line 220, the server notes that changes, and sets the limit in the Trade Alert system.

It will be apparent to those with skill in the art that there are many alterations that may be made in the embodiments described without departing from the spirit and the scope of the invention. For example, no specific code has been provided, because there are wide variations in the ways individual programmers may arrange code to accomplish essentially the same ends. Also there are, as was described above, many alterations in the ways that specific pieces of equipment might be interconnected to practice the present invention. The topology examples given are merely examples. There are similarly many sorts of services that may be employed and in which the features of the invention will be useful. The invention is limited only by the claims which follow.

What is claimed is:

1. A two-way pager system adapted for e-mail alerts, the system comprising:

a pager server adapted to send an alert message to a subscriber that one or more e-mail messages are available to be delivered; and a two-way pager device having a display for displaying the alert message sent by the server and having also two or more return buttons adapted for sending specific incremental signals to the pager server; and a negotiator application executing on the pager server sending the alert message for receiving the incremental signal initiated by the user pressing one of the return buttons in response to the alert message;

wherein the negotiator application determines the meaning of the incremental signal received and, initiated by the response, sends an associated message according to the meaning of the incremental signal received.

2. The server of claim 1 wherein the server on response from the two-way pager by way of selection of one of the return buttons, sends at least a portion of the e-mail message to the two-way pager, which then displays the message portion sent.

3. The server of claim 2 wherein the e-mail message is sent in increments, new successive increments triggered by return button responses from the two-way pager.

4. A method for routing an e-mail message for a subscriber, comprising steps of:

(a) storing the e-mail message sent to the subscriber on a pager server;

(b) sending a pager alert message including labels for return buttons to a two-way pager carried by the subscriber, alerting the subscriber of the presence of the e-mail message;

(c) monitoring for incremental signals sent from the subscriber selecting the labeled return buttons;

(d) translating the incremental signals via a negotiator application executing on the pager server; and (e) forwarding at least a portion of the e-mail message to an appropriate destination according to the meaning of the incremental signal returned.

5. A method for providing a prestored return message to a sender of an e-mail message, comprising steps of:

(a) storing the e-mail message at a pager server;

(b) alerting a subscriber of the presence of the e-mail message by sending a pager alert message to a two-way pager carried by the subscriber, the pager message including labels for return buttons;

(c) monitoring for an incremental signal sent by the subscriber selecting return buttons;

(d) translating the incremental signal via a negotiator application executing on the pager server; and (e) sending the prestored return message according to the meaning of the incremental signal returned.

* * * * *